(12) United States Patent
Barrenscheen et al.

(10) Patent No.: US 8,710,873 B2
(45) Date of Patent: Apr. 29, 2014

(54) SYSTEM AND METHOD FOR A DRIVER CIRCUIT WITH A REFERENCED CONTROL SIGNAL

(75) Inventors: Jens Barrenscheen, Munich (DE); Laurent Beaurenaut, Neubiberg (DE); Marco Bachhuber, München (DE); Tommaso Bacigalupo, Fuerstenfeldbruck (DE); Marcus Nuebling, Olching Esting (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 13/598,163

(22) Filed: Aug. 29, 2012

(65) Prior Publication Data

US 2014/0002141 A1  Jan. 2, 2014

Related U.S. Application Data

(60) Provisional application No. 61/666,805, filed on Jun. 30, 2012.

(51) Int. Cl.
*H03K 3/00* (2006.01)

(52) U.S. Cl.
USPC .................................. 327/108; 327/112

(58) Field of Classification Search
USPC ................................ 327/108–112
See application file for complete search history.

(56) References Cited

U.S. PATENT DOCUMENTS 6,348,819 B1 * 2/2002 Pierick et al. ............ 327/110

* cited by examiner

*Primary Examiner* — Kenneth B. Wells
(74) *Attorney, Agent, or Firm* — Slater & Matsil, L.L.P.

(57) ABSTRACT

In accordance with an embodiment, a method of operating a gate driving circuit includes receiving a reference timing pulse, measuring the received timing pulse according to a local clock generator of the gate driving circuit, and generating a switching control signal based on the measured received timing pulse.

20 Claims, 8 Drawing Sheets

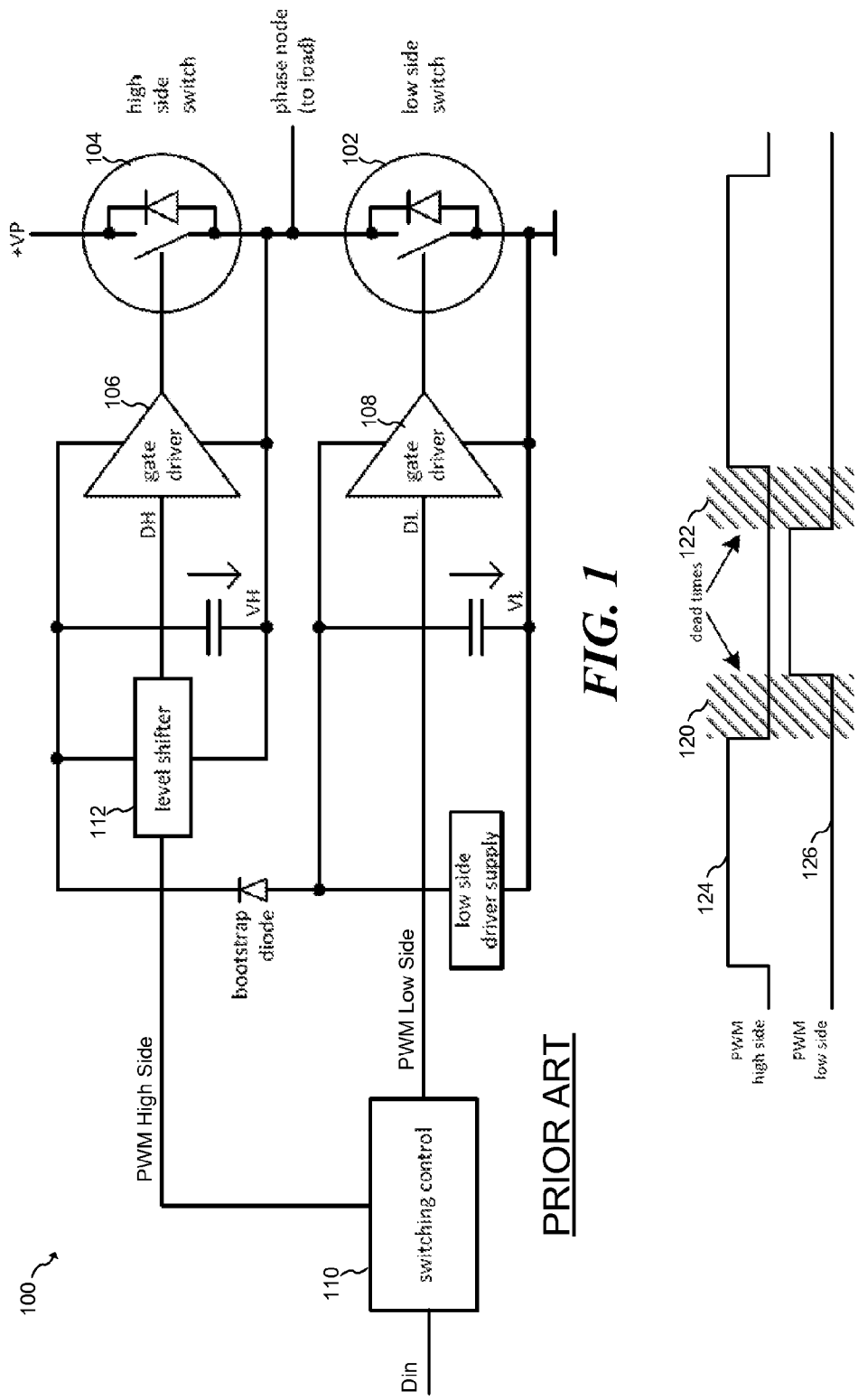

US 8,710,873 B2

SYSTEM AND METHOD FOR A DRIVER CIRCUIT WITH A REFERENCED CONTROL SIGNAL

PRIORITY CLAIM TO PROVISIONAL APPLICATION

This patent application claims priority to U.S. Provisional Application No. 61/666,805 filed on Jun. 30, 2012, entitled "System and Method for a Driver Circuit," which application is hereby incorporated by reference herein in its entirety.

TECHNICAL FIELD

This invention relates generally to semiconductor circuits and methods, and more particularly to a system and method for a driver circuit.

BACKGROUND

In electronic systems such as power supplies, motor controllers, and electrical distribution networks, high voltage power transistors are used in high current paths to switch currents. Recent improvements in semiconductor device technology has allowed for high power transistors that switch faster and dissipate less power during operation. Two common power transistor types are the metal-oxide semiconductor field-effect transistor (MOSFET), and the integrated gate bipolar transistor (IGBT). While both transistor types can be manufactured to handle large amounts of current, care must be taken in operating the transistors to avoid destruction of the device during normal operation and during electrostatic discharge (ESD) events. For example, the gate voltage of the MOSFET or IGBT is managed in order to prevent overvoltage of the gate and/or latch up of the device.

MOSFET and IGBT transistors are commonly driven by gate driver circuits that receive a low-power input and generate a drive signal for the power MOSFET or IGBT. For example, a gate driver can be used to provide an interface between a pulse-width-modulation controller and a power transistor in a motor control circuit or a switched-mode power supply. Gate drivers may be implemented as dedicated integrated circuits, discrete transistors, or transformers, or may be integrated within a controller unit. However, partitioning the gate-drive in a PWM controller allows the controller to run cooler and be more stable by eliminating the high peak currents and heat dissipation needed to drive a power MOSFET at very high frequencies.

SUMMARY OF THE INVENTION

In accordance with an embodiment, a method of operating a gate driving circuit includes receiving a reference timing pulse, measuring the received timing pulse according to a local clock generator of the gate driving circuit, and generating a switching control signal based on the measured received timing pulse.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a half-bridge topology that includes a low side switch and a high side switch;

FIG. 2 illustrates a PWM pattern having a dead time between the switches;

Figure 3A:
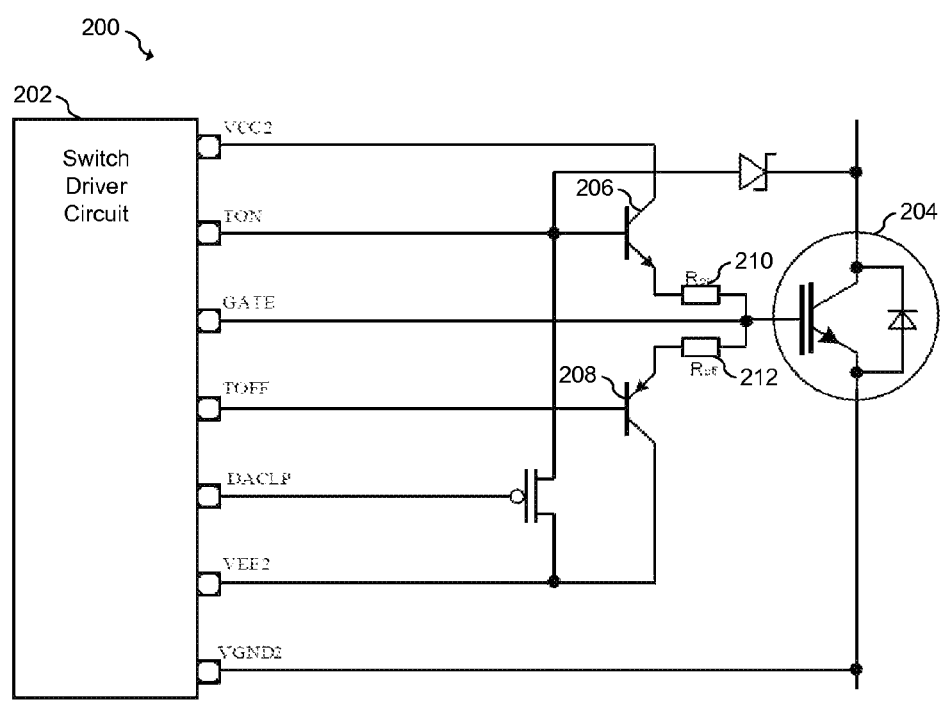
FIGS. 3a-b illustrates a drive circuit and corresponding waveform diagrams showing switching with a TLTO mechanism.
Figure 3A:
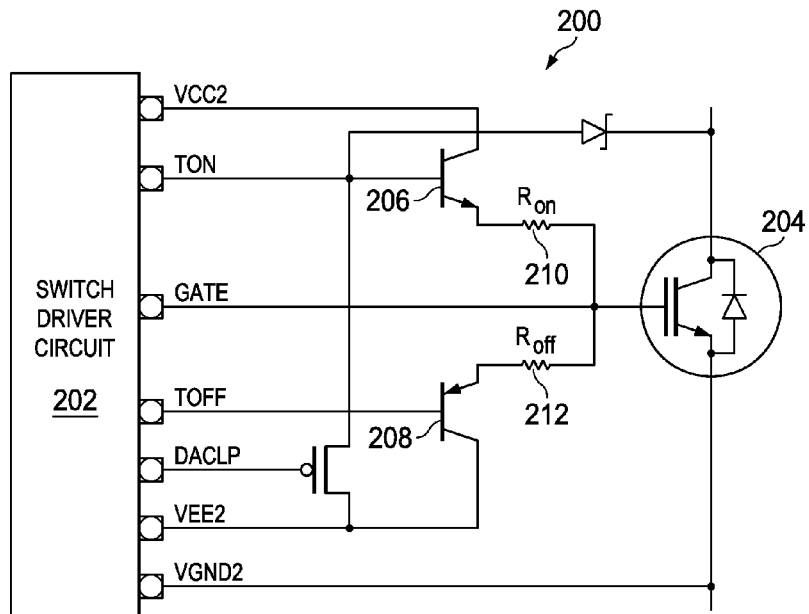

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a switch driver circuit. The invention may also be applied, however, to other types of circuits, systems, and methods directed toward signal generation and/or calibration.

Electronic power switches, such as MOSFETs and IGBTs, are used in many applications where electric loads are driven, such as AC motors, power supplies, and other circuits. Such switches may include MOSFETs and IGBTs, and may be controlled by pulse patterns generated by a switching control unit such as a microcontroller or other electronic components. One example of such an application is half-bridge topology 100 illustrated in FIG. 1.

Half-bridge topology 100 includes low side switch 102 driven by low side gate driver 108 and high side switch 104 driven by high side gate driver 106. While control signals for high side switch 104 and the low side switch 102 may be initially generated by switching control unit 110, in many cases, switching control unit 110 is not directly connected to the control nodes of power switches 102 and 104. Therefore, gate driver components 106 and 108 are introduced between switching control unit 110 and the power switches 104 and 102, respectively. These gate driver components "translate" the logic level of control signals delivered by switching control unit 110 to the current and voltage levels required by the power switches 102 and 104. In topologies with a high side switch, level shift mechanism 112 may be used because the ground potential of switching control unit 110 differs from the ground potential of gate driver component 106 for high side power switch 104.

In embodiments, the delay between the switch-on request to switching control unit 110 via input Din and the actual point in time when the power switch is actually switched on differs from the delay for the switch-off action. To avoid a shoot through condition in which both switches are on at the same time, a dead time between the deactivation of one switch control signal and the activation of the other switch control signal is introduced, as shown in FIG. 2, which illustrates a typical pulse pattern that may be used to control half-bridge topology 100 of FIG. 1. As shown, dead time 120 introduces a delay between the time in which high side signal 124 is turned off and low side signal 126 is turned on. Likewise, dead time 122 introduces a delay between the time in which low side signal 126 is turned off and high side signal 124 is turned on. In some embodiments, the width of the dead times may be generated digitally by switching control unit 110 and may be independent from local timings in the different gate driver components.

In addition to the translation of the control signal levels to the power switch levels, gate driver components may also fulfill monitoring and protection tasks related to the power switches, for example, measuring the current and automatic switch off in case of overcurrent through the switch. These tasks may be autonomously handled by the gate driver component.

In cases where the switch current is too high, it may be impossible to turn off the power switch immediately without risking damage or destruction of the switching device. Therefore, the gate voltage of the power switch is first reduced to a defined level and the switch is turned off after a certain time has elapsed. This mechanism is called "two-level turn off" (2LTO or TLTO). In some embodiments, two-level turn off methods may be applied to driving IGBT switches in order avoid latch-up of the switching transistor under high current conditions.

Figure 3B:
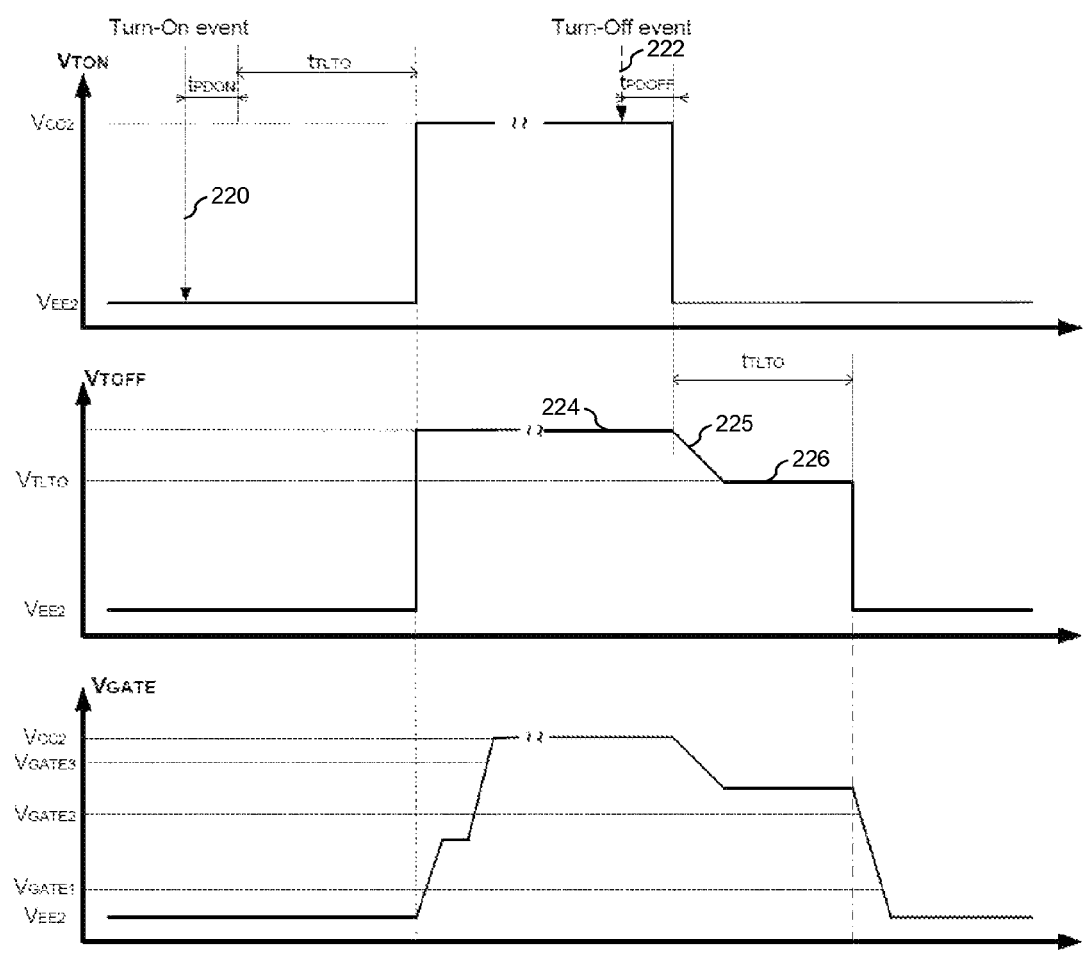

FIGS. 3a-b show a circuit and corresponding waveform diagrams that illustrate the operation of a two-level turn off operation. FIG. 3a illustrates embodiment switch driver system 200 having switch driver circuit 202 coupled to IGBT switch 204 via transistors 206 and 208 and resistors 210 and 212. In an embodiment, transistor 204 is configured to be turned on via pin TON coupled to the base of NPN transistor 206 and resistor 210 in series with the emitter of transistor 206. Transistor 204 is further configured to be turned off via pin TOFF coupled to the base of PNP transistor 208 and resistor 212 coupled in series with the emitter of transistor 208.

FIG. 3b illustrates waveform diagrams showing voltage VTON that represents the voltage at pin TON, VTOFF that represents the voltage at pin TOFF, and VGATE that represents the voltage at the gate of transistor 204 during switching with a TLTO mechanism. In an embodiment, TON is a control signal that switches on the gate signal of the power switch, and TOFF is a control signal that switches off the gate signal of the power switch. In alternative embodiments, the functionality of signals TON and TOFF may be combined into a single signal.

As can be seen by FIG. 3b, pin TON is asserted at a time delay $t_{TLTO}+t_{PDON}$ after the assertion of turn-on event 220, and de-asserted delay $t_{PDOFF}$ after turn-off event 222. Like pin TON, pin TOFF is also asserted time delay $t_{TLTO}+t_{PDON}$ after the assertion of turn-on event 220; however, after turn-off event 222 and delay $t_{PDOFF}$, the voltage of pin TOFF is lowered from voltage level 224 to voltage level 226 ($V_{TLTO}$) for a duration of $t_{TLTO}$, after which the voltage of pin TOFF is lowered to VEE2. In some embodiments, transition 225 between voltage levels 224 and 226 may be performed at a controlled slew rate, which may be programmable. The voltage at the gate of transistor 204 represents a level shifted and resistively combined combination of the voltages at pins TON and TOFF.

During the TLTO time (tTLTO), the gate of transistor 204 sees a reduced gate drive voltage before being shut off, such that the current through switching transistor 204 is reduced to a level that may be switched off without the risk of device damage and/or destruction. Intrinsic propagation delays $t_{PDOFF}$ and $t_{PDON}$ represent the delay between the point in time at which the switching control unit delivers the switching event to the input of the gate driver, and the point in time at which the gate driver can react to this request.

In some cases, the TLTO mechanism may be used for switching off the power switch under normal operating conditions as well as in the case of overcurrent. The introduction of $t_{TLTO}$ only during the switching off phase may lead to a modification of the on time of the power switch compared to the original switch control signal. To avoid this effect, $t_{TLTO}$ may be further introduced as a waiting time before the gate driver switches on the power switch after it receives an on request from the switching control unit.

In some cases, the accuracy and reliability of the exact timing of $t_{TLTO}$ may influence the quality of the power application. As such, the difference and deviation between the timing of the gate drivers of the power bridge may minimized in some applications. In embodiments of the present invention, the timing of $t_{TLTO}$ is locally generated in each gate driver component independently from the switching control unit. As such, a high local precision for the $t_{TLTO}$ generation may be implemented in some embodiments of the present invention.

Figure 4:
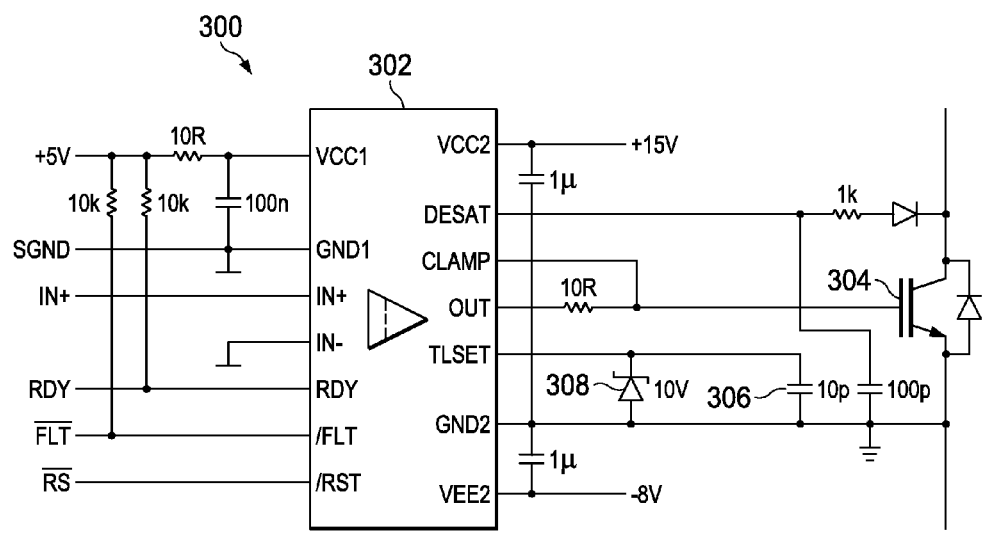
FIG. 4 illustrates an example of TLTO parameter adjustment using external components.

FIG. 4 illustrates conventional gate driver system 300 in which gate driver circuit 302 is coupled to switching transistor 304. Here, the timing of TLTO is set using external capacitor 306 and zener diode 308. In other conventional implementations, the timing of TLTO may be set using other external components, such as resistors to adjust the timing from application to application. These external components, however, may have parametric variations that limit the accuracy of the TLTO parameter. In addition to external device variation, internal variation, such as on-chip variation due to changing production parameters, temperature, and supply voltage, etc. may exceed 10-20% in some instances. To reduce these device-related tolerances, the gate drivers may be trimmed during the production and test process. To achieve such trimming, additional steps are performed during production and adjustable circuitry, including a memory for trimming parameters, may be used.

In an embodiment driver device, a communication channel, such as a serial bus connection between the switching control unit and the gate driver components may be used to configure device parameters, such as TLTO timing, and to provide device monitoring. In some embodiments, systems and methods, such as those related to monitoring, may be used that are described in U.S. patent application Ser. No. 13/356,343 filed on Jan. 23, 2012 entitled, "Methods for Monitoring Functionality of a Switch and Driver Units for Switches," which is incorporated herein by reference in its entirety.

In an embodiment, a communication channel allows a system control unit to set the gate driver component into a learning mode. In this learning mode, parameters such as TLTO timing are dynamically stored locally in the gate driver components and, thus, do not need to be permanently stored. Alternatively, the external components may also be considered as permanent storage. This first step already simplifies the gate driver components if no permanent memory is used.

If no additional signal connections are needed between the switching control unit and the gate drivers, for example, those used in a learning mode compared to a normal operating mode, the board design may be simplified.

In an embodiment, each gate driver has its own internal clock generator and state machine that may be used to generate TLTO timing, as well as other switching related timings. The untrimmed frequencies of these local clock generators, however, may differ from device to device due to variation of production parameters.

In an embodiment, the gate drivers are set to a learning mode and receive reference timing pulses. The length of the reference timing pulse is locally measured and captured by each gate driver component using, for example, a local state machine with respect to its own, local clock generator. After each gate driver receives the reference timing pulse, each gate driver component may reproduce a timing related to the measured reference timing pulse.

Figure 5:
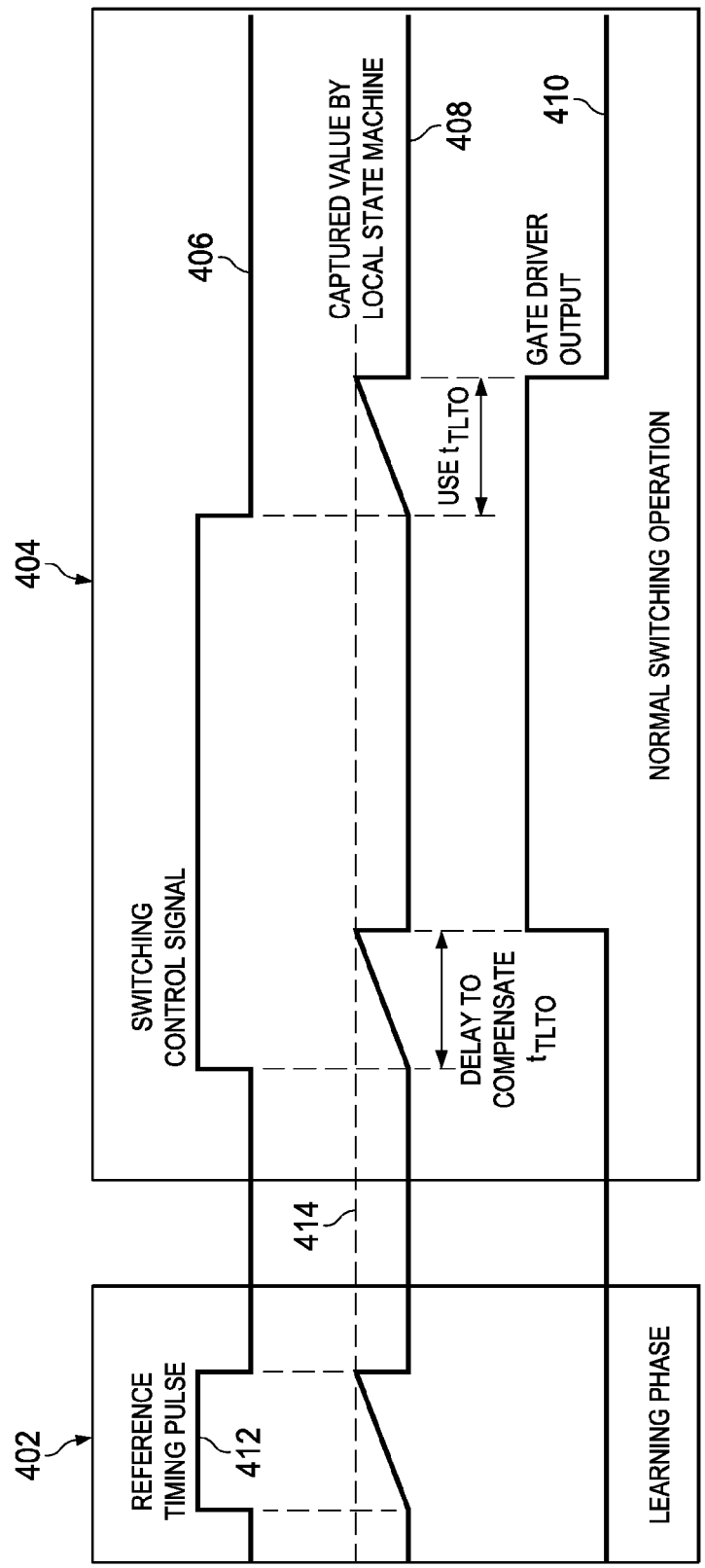
FIG. 5 illustrates a waveform diagram showing an embodiment reference timing pulse during a learning phase before normal switching operation.

FIG. 5 illustrates a waveform diagram showing an embodiment reference timing pulse during learning phase 402 before normal switching operation, and during normal switching operation 404. Waveform trace 406 represents a switching control input, trace 408 represents an output of a counter or accumulator, and trace 410 represents the gate driver output. During learning phase 402, counter output 408 is incremented during reference timing pulse at the switching control input. The value of counter output 408 at the end of reference timing pulse 412 is captured, for example, by storing counter output 408 in memory. During learning phase, 402, gate driver output 410 is not activated.

During normal operation phase 404, the counter output 408 begins incrementing at the rising edge of switching control input 406. Once counter output 408 reaches captured value 414, gate driver output 410 is activated and counter output 408 is reset. At the falling edge of switching control input 406, counter output 408 once again begins incrementing. When counter output 408 again reaches captured value 414, gate driver output 410 is de-activated.

Figure 6:
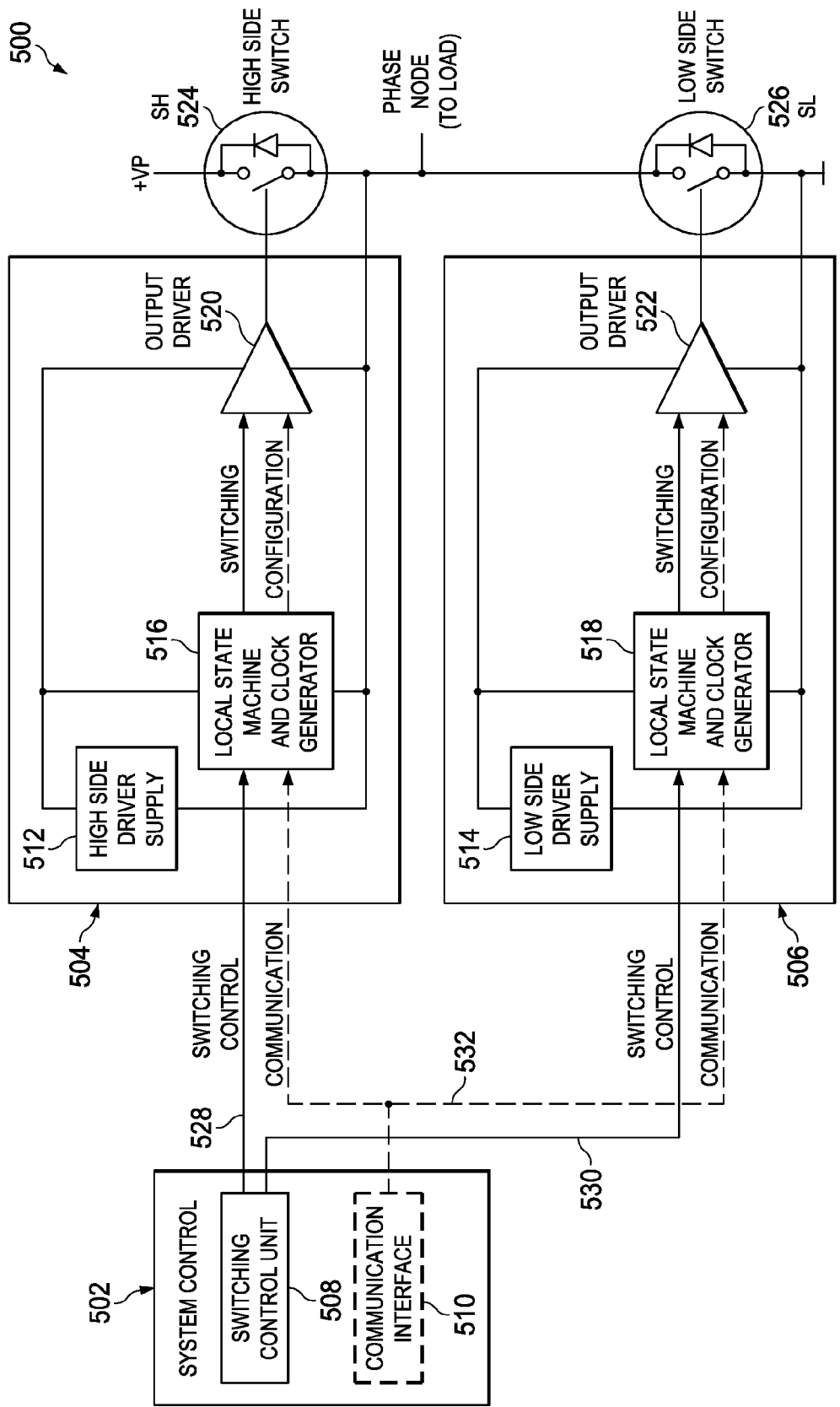
FIG. 6 illustrates embodiment gate driver components interfaced with a communication channel.

FIG. 6 illustrates embodiment switching system 500. In an embodiment, switching system has system controller 502 coupled to high side gate driver circuit 504 and low side gate driver circuit 506 via switching control lines 528 and 530 and via communication interface lines 532, which may be implemented according to a serial interface standard such as SPI, IIC, or other serial interface standard. Alternatively, a non-standard serial interface may also be used.

High side gate driver circuit and low side gate driver circuits 504 and 506 may each be implemented by an integrated circuit or by a hybrid system, such as a plurality of circuits disposed on a packaged substrate, or by a board level circuit disposed on a printed circuit board (PCB). The output of high side driver circuit 504 is coupled to the gate of switching transistor 524 and the output of low side driver circuit 506 is coupled to the gate of switching transistor 526. In some embodiments, the output gate driver circuits 504 and 506 may be directly coupled to the gates of transistors 524 and 526, or may be coupled via resistors, transistors, and other components as shown, for example, in FIG. 3a.

In an embodiment, high side driver 504 has high side driver supply block 512 that generates the power supply for local state machine and clock generator 516 and output driver 520. Local state machine and clock generator 516 provides switching and configuration signals for output driver 520. Configuration signals may include, for example, target voltage levels used for two-level turn-off methods described above. Similarly, low side driver 506 has low side driver supply block 514 that generates the power supply for local state machine and clock generator 518 and output driver 522, and local state machine and clock generator 516 provides switching and configuration signals for output driver 520. In an embodiment, local state machine and clock generator blocks 516 and 518 each implement embodiment learning modes, normal operation modes and TLTO generation as described in embodiments, herein.

System control circuit 502 has switching control unit 508 that generates switching control signals 528 and 530. In some embodiments, switching control unit applies dead zone regions to these signals to avoid shoot though current as described above with respect to FIG. 2. Communication interface 510 may be used to issue commands to driver circuits 504 and 506. Such commands may include configuration commands, requests to receive status, such as error messages, or commands to place driver circuits 504 and 506 in various operation modes, such as the learning mode and normal operation mode as described herein.

In embodiments, system control circuit 502, high side driver supply 512, low side driver supply 514 and output drivers 520 and 522 may be implemented using power supply and output driver circuits and methods known in the art.

Figure 7:
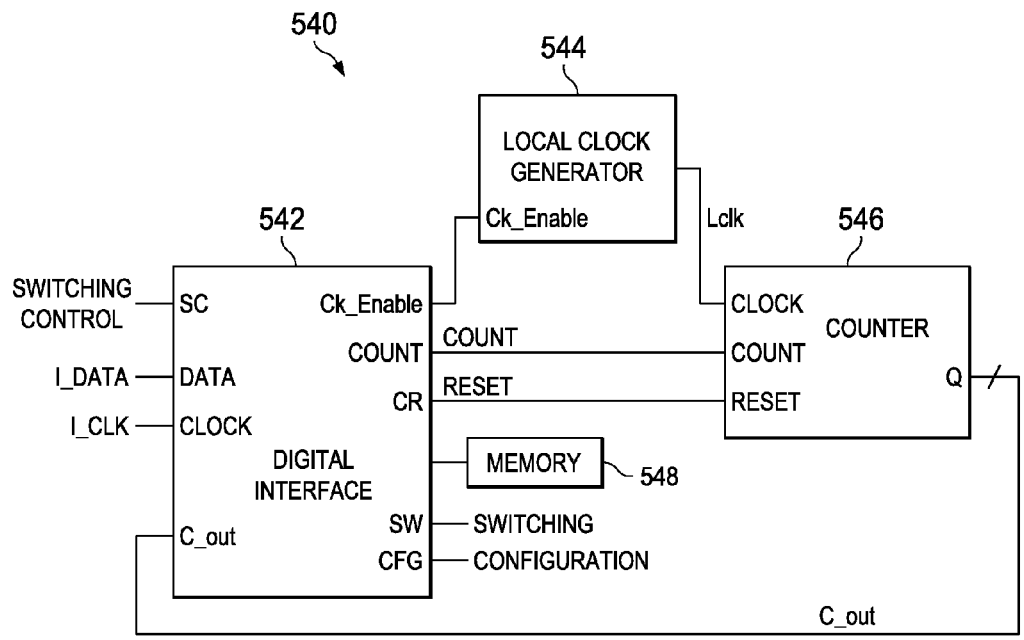
FIG. 7 illustrates embodiment digital control circuitry.

FIG. 7 illustrates embodiment circuitry 540 that may be used to implement state local state machine and clock generator 516 and 518 shown in FIG. 6. Digital interface and control logic 542 is coupled to input Switching Control that provides a switching control signal during calibration as well as a reference timing pulse during normal operation. Alternatively, the reference timing pulse and switching control signal may be implemented as two separate inputs. Using a single input signal, however, may use less pins than using separate inputs. Signals I_DATA and I_CLK are configured to be coupled to a communication interface. Signals Switching and Configuration are configured to be coupled to a later output driver stage.

Digital interface is further coupled to counter 546, which may be used to measure a width of the reference timing pulse, and to generate delay tTLTO as described above. Digital interface and control circuit 542 is coupled to counter 546 via signals Count, Reset and C_out. In an embodiment, digital interface and control circuit 542 asserts signal Count during the reference pulse and after edge transitions of the switching control signal so that counter 546 increments as described herein with respect to FIG. 5. In some embodiments, a low-to-high transition on the switching control input signal causes counter 546 to increment for the duration of the high level at the Switching Control input. At a high-to-low transition of the switching control input, counter 546 is stopped and its content is transferred to memory 548 and/or to a configuration register, thereby storing the width of the reference pulse.

In some embodiments, signal Reset is asserted to reset counter 546 after the counter has completed incrementing and/or before the counter increments. During normal operation mode, digital interface and control circuit 542 may compare the output C_out of counter 546 with the stored TLTO value in memory 548 in order to determine when to stop incrementing counter 546 and when to change the state of the switching signal. In some embodiments, the stored TLTO value may be modified via commands using digital interface lines I_DATA and I_CLK.

Local clock generator 544 may be implemented on a same integrated circuit as digital interface and control circuit 542 and counter 546. In an embodiment, local clock generator 544 provides a local clock reference to counter 546. Local clock generator 544 may be implemented using circuit and methods known in the art. For example, local clock generator 544 may be a relaxation oscillator, a ring oscillator, an RC oscillator, or other oscillator circuit. In some embodiments, local clock generator 544 receives a clock enable signals Ck_Enable from digital interface 542. As such, local clock generator 544 may be enabled only when needed by the system, thereby reducing power consumption in operational modes during which local clock generator 544 is inactive.

Figure 8:
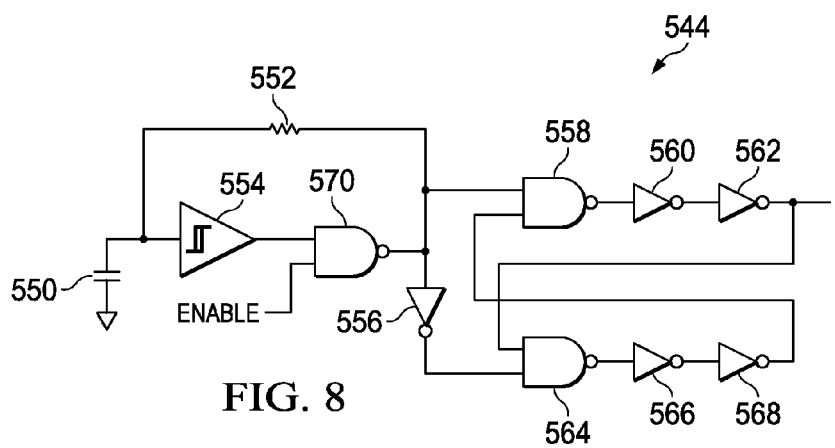
FIG. 8 illustrates an embodiment clock generator.

FIG. 8 illustrates one example of embodiment clock generator 544 having an RC oscillator made of capacitor 550, resistor 552, amplifier with hysteresis 554 and NAND gate 570. Here, the frequency of oscillator is based on the RC time constant of resistor 552 and capacitor 550. NAND gate may be used to stop the oscillator if signal Enable is low. The output of inverter 554 may be fed into a non-overlapping clock generator that includes NAND gates 558 and 564, and inverters 556, 560, 562, 566 and 568. Alternatively, other RC oscillator topologies known in the art may be used.

For most semiconductor technologies, an untrimmed clock generator may deliver a frequency with a tolerance of 10%-30% compared to a desired value due to variation of production parameters. In some embodiments, this uncertainty may be compensated by the learning phase. In some instances, the clock frequency may be stabilized with within a few percent over temperature and other effects. As a result, once the reference pulse has been captured, related timings may be reproduced quite precisely or within a specified range in some embodiments.

Although the captured numerical values related to the reference timing pulse may differ from gate driver to gate driver (due to the differing local clock generators), in some embodiments, the reproduced timings have adequate precision and/or the relative timing between gate drivers is closer to each other than would be the case with process variation between components. In some embodiments, the intrinsic inaccuracy of one local clock cycle due to synchronization effects of the incoming reference timing pulse may be neglected if the reference timing pulse is long compared with the local clock generator period.

In an embodiment, other switching timing related parameters may also be adjusted in a similar manner as TLTO. For example, reference points that define when to check for the gate voltage being in a certain range (safety monitoring feature) may be defined, as well as the length of the phase when active clamping is allowed or not allowed after switching of a power switch. It should be understood that these are just a small number of the many parameters that may be adjusted using embodiments systems and methods.

In an embodiment, a reference timing capture mechanism is introduced in the gate driver component during a learning phase, and a value derived from the captured value for modification of the switching behavior of the gate driver is applied during normal operation.

Figure 9:
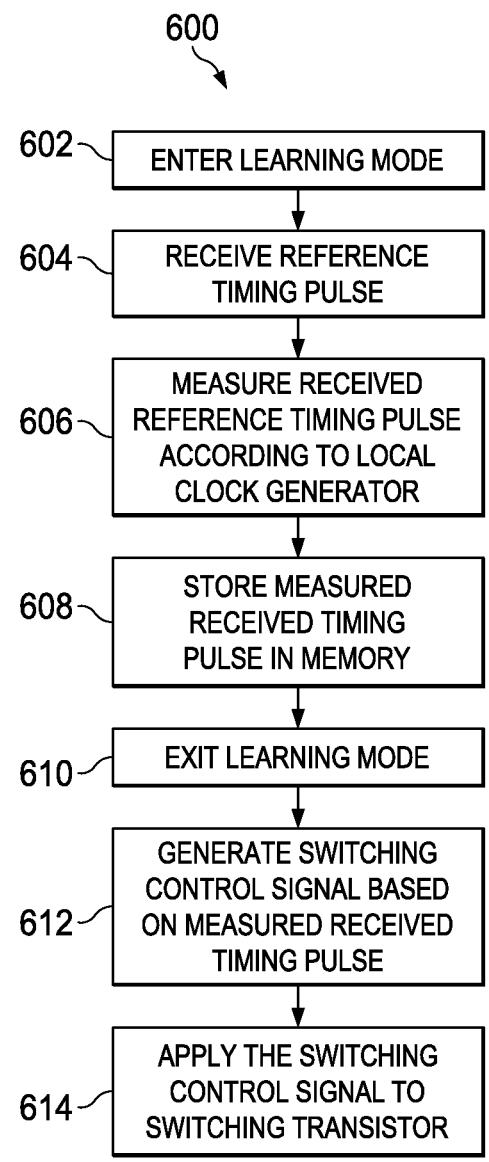
FIG. 9 illustrates a flowchart of an embodiment method.

FIG. 9 illustrates a flowchart of embodiment method 600. In accordance with an embodiment, a method of operating a gate driving circuit includes receiving a reference timing pulse (step 604), measuring the received timing pulse according to a local clock generator of the gate driving circuit (step 606), and generating a switching control signal based on the measured received timing pulse in step 612. The method may further include storing the measured received timing pulse in a memory in step 608 and/or applying the switching control signal to a switching transistor in step 614. In some embodiments, steps 604, 606 and 608 are performed in a learning mode that is entered in step 602 prior to receiving the timing pulse in step 604, and exited after the measured received timing pulse is stored in memory in step 608.

In an embodiment, generating the switching control signal based on the measured received timing pulse includes operating the gate driving circuit in a normal mode. Operation in the normal mode includes receiving a switching control signal transition from an inactive state to an active state, activating a gate driver output a first time period after receiving the switching control signal transition from an active state to an inactive state, receiving a switching control signal transition from the active state to the inactive state, and deactivating the gate driver output the first time period after receiving the switching control signal transition from an active state to an inactive state. The first time period is based on the measured received timing pulse.

In an embodiment, generating the switching control signal based on the measured received timing pulse includes operating in a high current state. Operating in the high current state includes receiving a switching control signal transition from an active state to an inactive state, changing an output voltage of a gate driver output from a first voltage to a second voltage based on receiving the control signal transition, and changing the output voltage of the gate driver output from the second voltage to a third voltage after a first period of time based on the measured received timing pulse. The third voltage is configured to deactivate the switching transistor.

In an embodiment, measuring the received timing pulse includes using a state machine. The steps of receiving and measuring may be performed in a learning mode, and the step of generating may be performed in a normal mode. In some embodiments, the method further includes receiving a learning mode activation command from a digital bus, and operating the gate driving circuit in the learning mode in response to the learning mode activation signal.

In an embodiment, measuring the received timing pulse includes starting a counter at a beginning of the received timing pulse, modifying the counter according to a frequency of the local clock generator, and stopping the counter at an end of the received timing pulse. The counter may be modified, for example, by incrementing and/or decrementing the value of the counter. In some embodiments, the method further includes operating the local clock generator, which may include running a relaxation oscillator.

In accordance with a further embodiment, a circuit includes a clock generator, a state machine coupled to the clock generator, and an output driver having an input coupled to a switching control signal output of the state machine. The state machine is configured to receive a reference timing pulse, measure the received reference timing pulse according to the clock generator, and generate the switching control signal based on the measured received reference timing pulse. The clock generator, state machine and output driver may be disposed on an integrated circuit. In an embodiment, the clock generator comprises a relaxation oscillator. In some embodiments, the output driver is configured to drive a switching transistor such as an integrated gate bipolar transistor (IGBT).

In an embodiment, the state machine includes a counter configured to start modifying a counter value at a beginning of the received reference timing pulse and stop modifying the counter value at an end of the received reference timing pulse. In some embodiments, the counter may be modified by incrementing and/or decrementing the value of the counter. The circuit may also include a memory coupled to an output of the counter, wherein the memory is configured to store an output value of the counter.

In an embodiment, the output driver is configured to receive a switching control signal transition from an active state to an inactive state, change an output voltage of a gate driver output from a first voltage to a second voltage based on receiving the control signal transition, and after a first period of time based on the measured received reference timing pulse, change the output voltage of the gate driver output from the second voltage to a third voltage. The third voltage configured to deactivate a switching transistor coupled to the gate driver output.

In accordance with a further embodiment, a switch driving circuit includes an output driver configured to be coupled to a control node of a switching transistor, and a control circuit coupled to the output driver. The control circuit is configured to measure a reference pulse from a switching control input in a first mode of operation, and produce a first timing delay from the switching control input to an output of the output driver based on the measured reference pulse in a second mode of operation. The switch driving circuit may further include a communication interface coupled to the control circuit and coupled to a digital interface. The communication interface is configured to receive a configuration command from the digital interface and place the control circuit in the first mode of operation upon receipt of the configuration command. The output driver may be configured to drive an IGBT.

In an embodiment, the control circuit is further configured to change an output voltage of the output driver from a first voltage to a second voltage when the switching control input is de-asserted, and after the first timing delay, change the output voltage of the output driver from the second voltage to a third voltage. The third voltage is configured to deactivate the switching transistor.

In an embodiment, the switch driving circuit further includes a timing reference circuit, and the control circuit is configured to measure the reference pulse with respect to an output of the timing reference circuit. In some embodiments, the timing reference circuit is implemented as a relaxation oscillator.

An advantage of some embodiments includes the ability to accurately generate gate driver timing without trimming the gate drivers during manufacture. Additional advantages of some embodiments include the ability to accurately generate gate driver timing without the need and expense of using additional external components, and without resulting parametric variation in external components. A further advantage of embodiments include the ability to compensate for part to part variations of the frequency internal local clock generator, which results in better accuracy for application critical timing.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of operating a gate driving circuit, the method comprising:
   receiving a learning mode activation command from a digital bus;
   operating the gate driving circuit in a learning mode in response to the learning mode activation command;
   receiving a reference timing pulse while operating in the learning mode;
   measuring the received timing pulse according to a local clock generator of the gate driving circuit while operating in the learning mode; and
   generating a switching control signal based on the measured received timing pulse while operating in a first mode.

2. The method according to claim 1, further comprising storing the measured received timing pulse in a memory.

3. The method according to claim 1, further comprising applying the switching control signal to a switching transistor.

4. The method according to claim 1, wherein generating the switching control signal based on the measured received timing pulse comprises:
   operating in the first mode comprising:
      receiving a switching control signal transition from an inactive state to an active state,
      activating a gate driver output a first time period after receiving the switching control signal transition from an active state to an inactive state, wherein the first time period is based on the measured received timing pulse,
      receiving a switching control signal transition from the active state to the inactive state, and
      deactivating the gate driver output immediately or the first time period after receiving the switching control signal transition from an active state to an inactive state.

5. The method according to claim 1, wherein generating the switching control signal based on the measured received timing pulse comprises:
   operating in a high current state comprising
      receiving a switching control signal transition from an active state to an inactive state,
      changing an output voltage of a gate driver output from a first voltage to a second voltage based on receiving the control signal transition; and
      after a first period of time based on the measured received timing pulse, changing the output voltage of the gate driver output from the second voltage to a third voltage, wherein the third voltage is configured to deactivate the switching transistor.

6. The method according to claim 1, wherein the measuring the received timing pulse comprises using a state machine.

7. The method according to claim 1, wherein measuring the received timing pulse comprises:
   starting a counter at a beginning of the received timing pulse;
   modifying the counter according to a frequency of the local clock generator; and
   stopping the counter at an end of the received timing pulse.

8. The method according to claim 1, further comprising operating the local clock generator, said operating comprising running a relaxation oscillator.

9. A circuit comprising:
   a clock generator;
   a state machine coupled to the clock generator and a digital bus; and
   an output driver having an input coupled to a switching control signal output of the state machine, wherein the state machine is configured to
   receive a learning mode activation signal from the digital bus,
   operate the state machine in a learning mode in response to the learning mode activation signal,
   receive a reference timing pulse during operation in the learning mode,
   measure the received reference timing pulse according to the clock generator during operation in the learning mode, and
   modify the switching control signal based on the measured received reference timing pulse.

10. The circuit according to claim 9, wherein the clock generator, state machine and output driver are disposed on an integrated circuit.

11. The circuit according to claim 9, wherein the state machine comprises a counter configured to start modifying a counter value at a beginning of the received reference timing pulse and stop modifying the counter value at an end of the received reference timing pulse.

12. The circuit according to claim 11, further comprising a memory coupled to an output of the counter, wherein the memory is configured to store an output value of the counter.

13. The circuit according to claim 11, wherein the clock generator comprises a relaxation oscillator.

14. The circuit according to claim 11, wherein the output driver is configured to:
   receive a switching control signal transition from an active state to an inactive state;
   change an output voltage of a gate driver output from a first voltage to a second voltage based on receiving the control signal transition; and
   after a first period of time based on the measured received reference timing pulse, change the output voltage of the gate driver output from the second voltage to a third voltage, wherein the third voltage configured to deactivate a switching transistor coupled to the gate driver output.

15. The circuit according to claim 11, wherein the output driver is configured to drive an integrated gate bipolar transistor (IGBT).

16. A switch driving circuit comprising:
   an output driver configured to be coupled to a control node of a switching transistor;
   a control circuit coupled to the output driver, the control circuit configured to
      measure a reference pulse from a switching control input in a first mode of operation, and
      produce a first timing delay from the switching control input to an output of the output driver based on the measured reference pulse in a second mode of operation; and
   a communication interface coupled to the control circuit and coupled to a digital interface, wherein the communication interface is configured to receive a configuration command from the digital interface and place the control circuit in the first mode of operation upon receipt of the configuration command.

17. The switch driving circuit according to claim 16, wherein the control circuit is further configured to:
   change an output voltage of the output driver from a first voltage to a second voltage when the switching control input is de-asserted; and
   after the first timing delay, change the output voltage of the output driver from the second voltage to a third voltage, wherein the third voltage configured to deactivate the switching transistor.

18. The switch driving circuit according to claim 17, wherein the output driver is configured to drive an integrated gate bipolar transistor (IGBT).

19. The switch driving circuit according to claim 16, further comprising a timing reference circuit, wherein the control circuit is configured to measure the reference pulse with respect to an output of the timing reference circuit.

20. The switch driving circuit according to claim 19, wherein the timing reference circuit comprises a relaxation oscillator.

* * * * *

UNITED STATES PATENT AND TRADEMARK OFFICE
CERTIFICATE OF CORRECTION

| | | |
|---|---|---|
| PATENT NO. | : 8,710,873 B2 | Page 1 of 1 |
| APPLICATION NO. | : 13/598163 | |
| DATED | : April 29, 2014 | |
| INVENTOR(S) | : Jens Barrenscheen | |

It is certified that error appears in the above-identified patent and that said Letters Patent is hereby corrected as shown below:

In the Specification:

In Col. 7, line 22, immediately after "stabilized" delete "with".

Signed and Sealed this
Twelfth Day of August, 2014

Michelle K. Lee
*Deputy Director of the United States Patent and Trademark Office*